United States Patent
Kim et al.

[11] Patent Number: 6,115,609
[45] Date of Patent: Sep. 5, 2000

[54] GROUPING AND UNGROUPING AMONG OMNI-CELLS USING PN-OFFSET OF ONE CHANNEL

[75] Inventors: Tae-Hyoun Kim, Boochon; Yun-Hee Lee, Sungnam, both of Rep. of Korea

[73] Assignee: Samsung Electronics Co., Ltd., Rep. of Korea

[21] Appl. No.: 09/138,979

[22] Filed: Aug. 24, 1998

[30] Foreign Application Priority Data

Aug. 22, 1997 [KR] Rep. of Korea ............ 97-40041

[51] Int. Cl.$^7$ .................. H04Q 7/20; H04Q 7/00
[52] U.S. Cl. .......... 455/442; 455/450; 455/443; 370/331; 370/332
[58] Field of Search .................. 455/442, 450, 455/443, 561, 456, 458, 524, 525, 432, 435; 370/331, 332

[56] References Cited

U.S. PATENT DOCUMENTS

| | | | |
|---|---|---|---|
| 5,691,974 | 11/1997 | Zehavi et al. | 370/203 |
| 5,722,043 | 2/1998 | Rappaport et al. . | |
| 5,974,324 | 10/1999 | Henson | 455/447 |
| 5,991,284 | 11/1999 | Willenegger et al. | 370/335 |

*Primary Examiner*—Fan Tsang
*Assistant Examiner*—Sheila Smith
*Attorney, Agent, or Firm*—Dilworth & Barrese

[57] ABSTRACT

A method for grouping and ungrouping omni-cells in a mobile communications system using a common PN-offset in one channel so as to manage a plurality of cells in a manner similar to a method by which an omni-cell is managed using a unique PN offset. Cell grouping is performed by generating a common PN offset in each of the cells to be grouped by selecting an unused path in each channel of each cell, and then changing the unique PN offset of each of the cells to the common PN offset of the selected path.

3 Claims, 5 Drawing Sheets

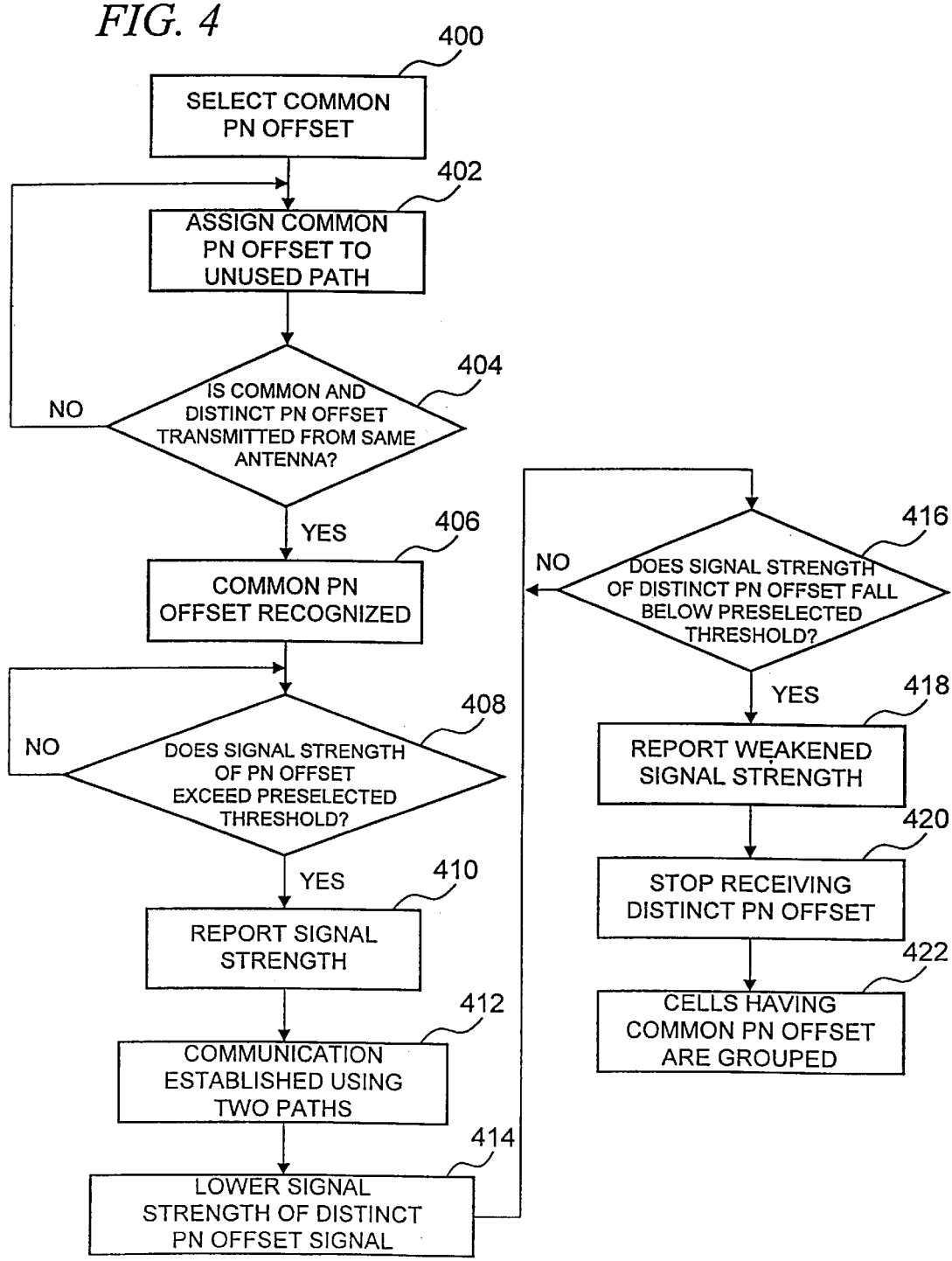

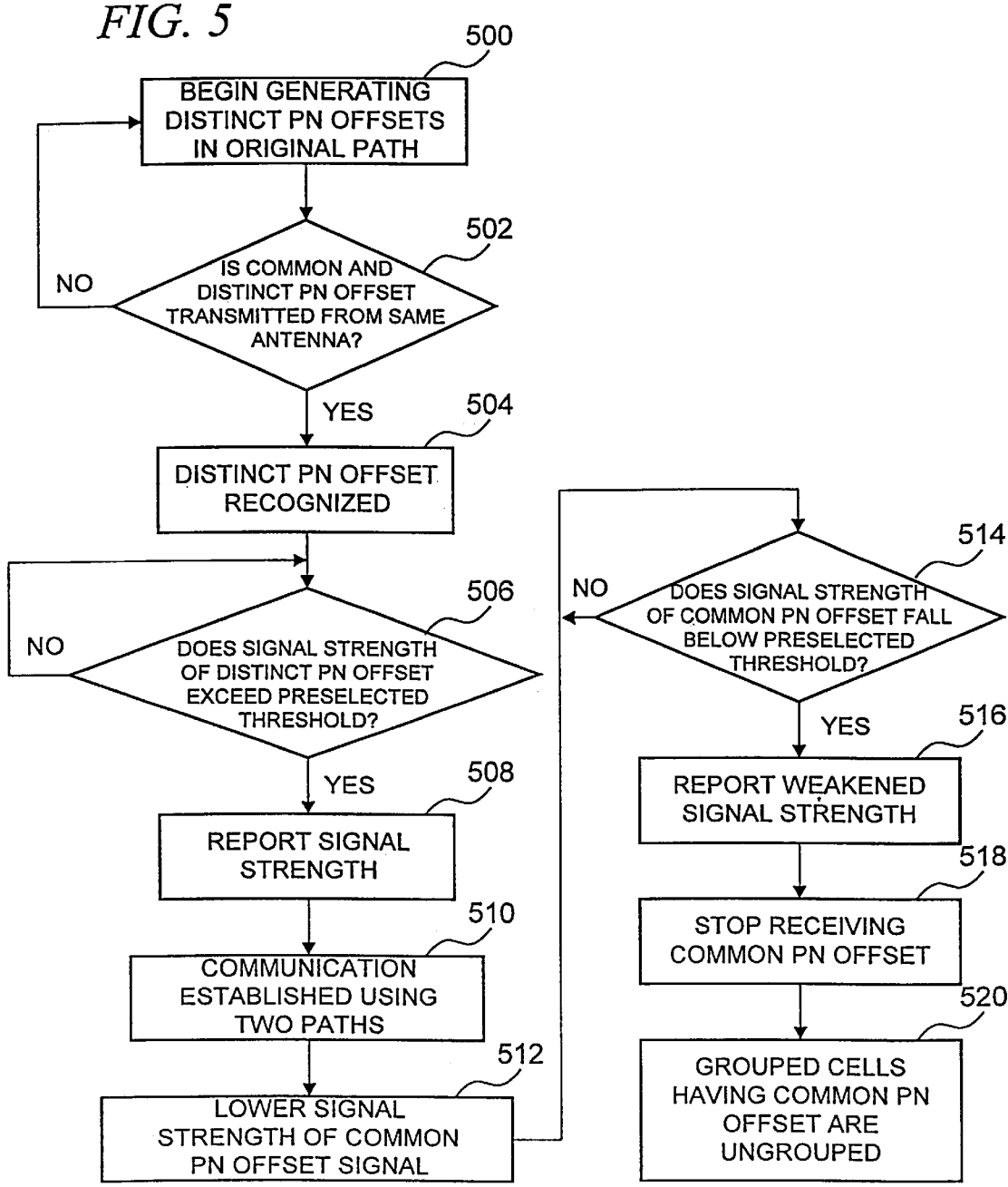

GROUPING AND UNGROUPING AMONG OMNI-CELLS USING PN-OFFSET OF ONE CHANNEL

BACKGROUND

1. Technical Field

The present application relates generally to cellular communication systems and, in particular, to a method for grouping and ungrouping omni-cells using a common PN (Pseudorandom Noise) offset of one channel of each of the grouped cells in order to reduce signal traffic resulting from excessive handoffs, thereby decreasing the load on BTSs (Base Station Transceiver Subsystems).

2. Description of the Related Art

In general, mobile communication systems such as PCS (Personal Communication Service) and CDMA (Code Division Multiple Access) systems include a plurality of BTS (Base Station Transceiver Subsystem) for serving mobile terminals located in corresponding regions, a plurality of BSCs (Base Station Controller), a plurality of BSMs (Base Station Manager System) for managing and controlling a plurality of BSCs and BTSs, a plurality of MSCs (Mobile Switching Center), and a plurality of HLRs (Home Location Register). A CDMA mobile communications system typically includes multiple access channels. Each of the multiple access channels are comprised of a given sinusoidal frequency which is combined with, and supports, a multiplicity of messages each using distinct PN offsets and sequences (i.e, spreading codes). In other words, each different sinusoidal frequency and its corresponding group of distinct spreading codes form a multiple channel carrier.

During operation, mobile stations should not suffer from communication disturbance when moving from region to region (i.e., cell to cell). Accordingly, when a mobile station is operating in an idle state, it continuously reregisters a plurality of parameters with the cellular system of the region (i.e., cell) in which the mobile station is currently located. Moreover, during a telephone conversation, communication between the mobile station and the BTS is managed by the mobile station, the BTS, and the MSC, so as to maintain a sufficient and efficient radio link.

In a CDMA system, a system can receive mobile transmissions from two or more BTSs at any given time. In addition, a mobile station can receive signals transmitted by two or more BTSs at any given time. Consequently, a handoff operation can occur from one BTS to another BTS, or from one antenna region to another antenna region in one BTS area. During a handoff operation, the success of call connection and the quality of voice information should not deteriorate. Upon receiving the appropriate communication signals, receivers and transmitters in the cellular communication system determine when transmission is imminent, which triggers them to establish a correct time reference for synchronization.

In order to achieve efficient synchronization at the time of synchronization (especially at the time of early synchronization of the system), it is desirable to utilize signals which exhibit maximum autocorrelation functions at a 0 time shift and very small autocorrelation functions at all other time shifts. For this purpose, specific code words may be stored in the memory of a transmitter and receiver. In addition, a binary shift register series generator (which is a relatively simple linear system) may be utilized to generate codes (i.e., binary sequences) which have sufficient autocorrelation characteristics. Specifically, a Pseudorandom pattern generator (or PN code generator), which is composed of n stage shift registers, can be employed to continuously generate n bit outputs of $2^n-1$ (except the case wherein all bits are zero). The resulting bit sequence is referred to as a "PN sequence" since it resembles random noise code (except, of course, to the individuals who know the choice of the number and taps of shift registers), but has a repeatable pattern. A PN sequence has very desirable autocorrelation properties since the maximum autocorrelation value of all the PN sequences is given at 0 shift and a reduced autocorrelation value at all the other time shifts in one cycle (i.e., one chip). Consequently, the power spectrum density for a PN sequence approaches white spectrum density as the series length increases.

In a CDMA system, the offset of a PN sequence (i.e., the PN offset) is utilized to expand the bandwidth of modulated signals so as to increase the transmission bandwidth. As stated above, the PN offset is also utilized to discern between BTSs associated with users who utilize the same transmission bandwidth (i.e., a multi-access channel of same frequency channel) in the CDMA system. In an omni-cell structure, one BTS covers a single cell region, and signals which are transmitted from the BTS are first multiplied by a PN offset and a user's long code before being transmitted.

Referring now to FIG. 1, a block/flow diagram illustrates assigning paths of modulator chip channel according to the prior art. As is known in the art, each BTS in the communication system includes a modulator chip which is located in a channel card within the digital unit (DU) of the BTS. In a CDMA mobile communications system, an orthogonal code spreading scheme using Walsh codes to spread I Q baseband signals (as shown in FIG. 1) is typically employed for user discrimination and spectrum spreading. Ideally, the orthogonality of the Walsh codes enables users or channels to be discriminated without interference. For each channel in the modulator of FIG. 1 (e.g., CHANNEL #1–#N), there are 3 paths in which the same input signal can travel. By way of example, referring to Channel #1, a signal is encoded by encoder module 10, bit interleaved by an interleaver module 20, scrambled by a scrambler module 20 with codes from a long code generator 40, multiplexed with multiplexer 50, and then transmitted through the 3 paths α, β, and γ. In the omni-cell structure discussed above, only the first path (i.e., the αpath) is used.

In general, each cell is discerned by a unique PN offset which is transmitted through a pilot channel. When a user (mobile station) travels between different cells, a handoff operation is performed by changing the unique PN offset associated with the source cell to the unique PN offset of the target cell. In areas having a significant amount of signal traffic due to an increase in the use of mobile stations by many subscribers, the rate of call connection can decrease due to system overload caused by an increased number of required handoff operations.

One method which is used to reduce the system load in a "hot spot" region (i.e., spatially localized user communication overloads which do not normally occur within a particular cellular region) is the dynamic channel assignment (or "channel borrowing") method disclosed in U.S. Pat. No. 5,722,043 to Rappaport et al. entitled "Method And Apparatus Of Assigning And Sharing Channels In A Cellular Communication System." Specifically, a plurality of cells (each having a centrally located base station) are formed into N clusters. Each cell included in the N cluster is allocated a set of distinct channels, which are further divided into subgroups of carriers. Each subgroup of carriers of each cell corresponds to an adjacent cell in the N cluster. When all of the distinct carriers assigned to a cell are utilized, a carrier can be borrowed from a corresponding subgroup of carriers of an adjacent cell.

The "borrowing" method disclosed in Rappaport is not of CDMA format, and does not disclose a method for grouping a plurality of cells (in which the grouped cells operate similar to an omni-cell) by utilizing a common PN offset for each grouped cell. Indeed, Rappaport teaches a general method of dynamically assigning channels of cells in a FDMA system. In addition, Rappaport does not teach a method for reducing loads of BTSs due to increased soft handoff operations (which cause the channels generated from two BTSs to generate double signal traffic).

SUMMARY OF THE INVENTION

The present invention is directed to a method for grouping and ungrouping omni-cells using a common PN-offset in one channel so as to manage a plurality of cells in a manner similar to the method by which an omni-cell is managed by a unique PN offset.

In one aspect, a method for grouping a plurality of cells in a cellular communication system, each of the cells including at least two channels each having a plurality of paths and each of the cells having a distinct PN (pseudorandom noise) offset pilot signal being assigned to a first path of the plurality of paths, comprises the steps of:

generating a common PN (pseudorandom noise) offset pilot signal at a second one of the paths of the channels in each of the plurality of cells, the common PN offset pilot signal not being utilized as the unique PN offset pilot signal at any of the plurality of cells;

determining if the common PN offset pilot signal and the distinct PN offset pilot signals are both emitted from an antenna;

recognizing, by a user terminal, a signal strength of the common PN offset pilot signal;

determining whether the signal strength of the common PN offset pilot signal exceeds a first preselected threshold if it is determined that the common and distinct PN offset signals are outputted from the antenna;

reporting the signal strength to a BTS (base station transceiver subsystem) if the signal strength exceeds the first preselected threshold;

establishing communication with users through the first and second paths;

weakening simultaneously the signal strength of distinct PN offset of the plurality of cells during the communication in the first and second paths;

reporting weakening of the distinct PN offset pilot signal to the BTS by the users of the plurality of cells;

commanding by the BTS to terminal equipment to receive only the common PN offset signals; and terminating, by the terminal, from transmitting and receiving the distinct PN offset signal, thereby grouping the plurality of cells having the common PN offset by transmitting and receiving only the PN offset.

In another aspect, a method for ungrouping a plurality of cells in a cellular communication system, each of the grouped cells including at least two channels each having a plurality of paths and each of the cells having a common PN (pseudorandom noise) offset pilot signal being assigned to one of the paths of the plurality of paths, comprises the steps of:

transmitting a plurality of distinct PN offset pilot signal at a first path in the channel for each of the grouped cells;

determining whether the distinct PN offset pilot signals and the common PN offset pilot signals of the grouped cells are outputted from the same antenna;

recognizing, by a user terminal, the distinct PN offset pilot signal after it is determined that the common and distinct PN offset signals are outputted from same antenna;

determining whether a signal strength of the distinct PN offset pilot signal exceeds a first preselected threshold;

reporting the signal strength of the distinct PN offset pilot signal to a BTS (base station transceiver subsystem) if the signal strength exceeds the first preselected threshold;

establishing communication with the user through path assigned to the common PN offset and the path assigned to the distinct PN offset of one channel;

simultaneously weakening the signal strength the common PN offset pilot signal of each of the grouped cells while communicating through the assigned paths;

determining whether the signal strength of the common PN offset pilot signal falls below a second preselected threshold;

reporting the signal strength of the common PN offset pilot signal to the BTS when the strength is determined to fall below the second preselected threshold;

commanding by the BTS to the user terminal equipment to receive only the distinct PN offset signals of the corresponding cells; and terminating, by the terminals, from transmitting and receiving the common PN offset, and ungrouping the grouped cells by transmitting and receiving only the corresponding distinct PN offset for each of the cells.

BRIEF DESCRIPTION OF THE DRAWINGS

FIG. 4 is a flow diagram which illustrates a method from grouping a plurality of cells in accordance with one aspect of the present invention; and FIG. 5 is a flow diagram which illustrates a method for ungrouping cells in accordance with one aspect of the present invention.

DESCRIPTION OF PREFERRED EMBODIMENTS

A plurality of cells can be managed via a common PN offset in a manner similar to the way in which an omni-cell is managed via a distinct PN offset. In particular, a plurality of cells may be grouped by designating a common PN offset which is used in conjunction with an unused path of the channels of the cells rather than the distinct PN offset which is used in the corresponding path of each cell under normal circumstances. Consequently, the system overload can be prevented by reducing the number of handoffs which result from the increase of traffic, thereby increasing the success rate of the call. When the increased handoff rate is subsequently reduced, all the cells are ungrouped to the original state to increase the number of channels.

Figure 1:
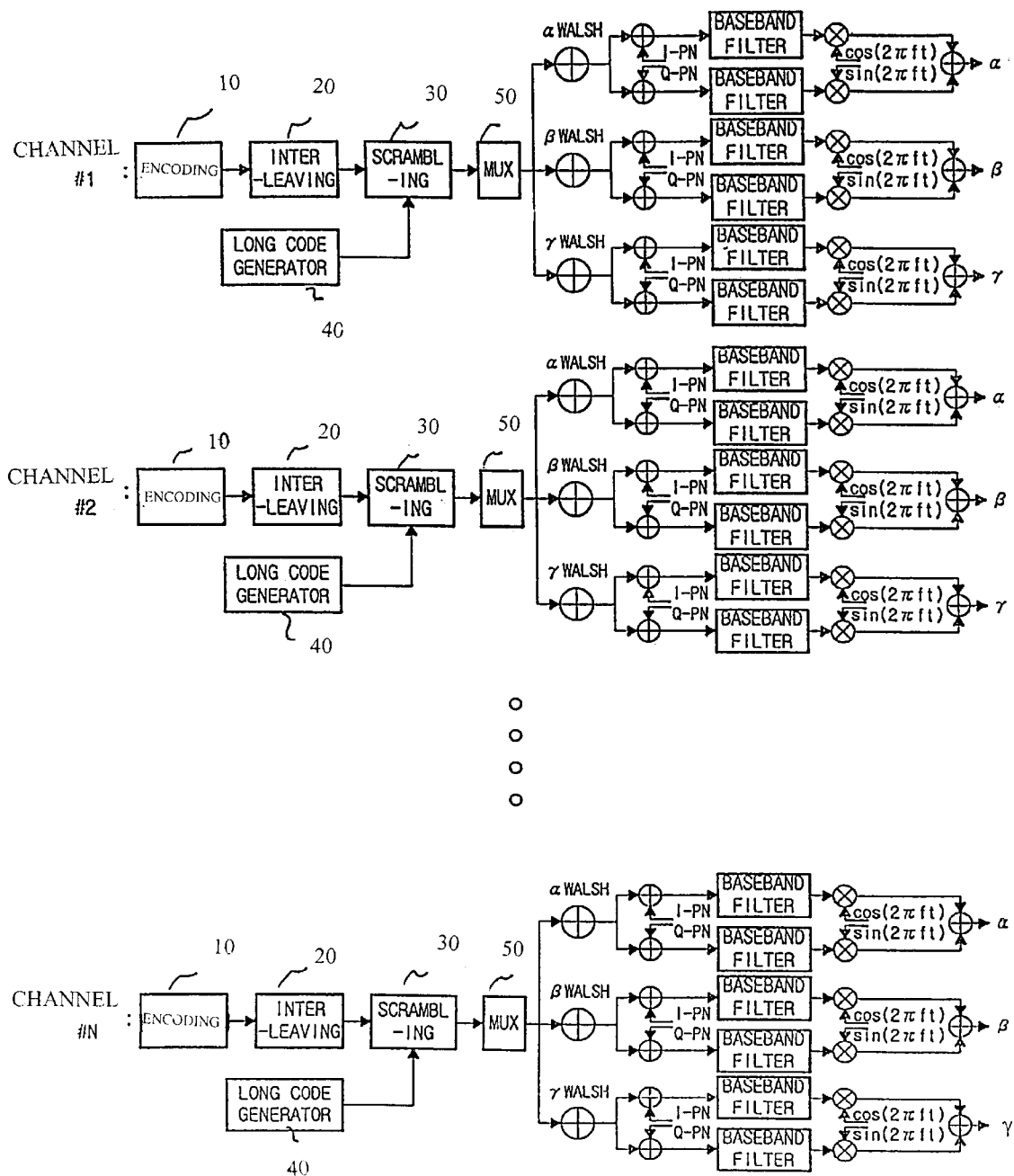
FIG. 1 is block/flow diagram of a channel assigning path of a modulator chip according to the prior art.
Figure 2:
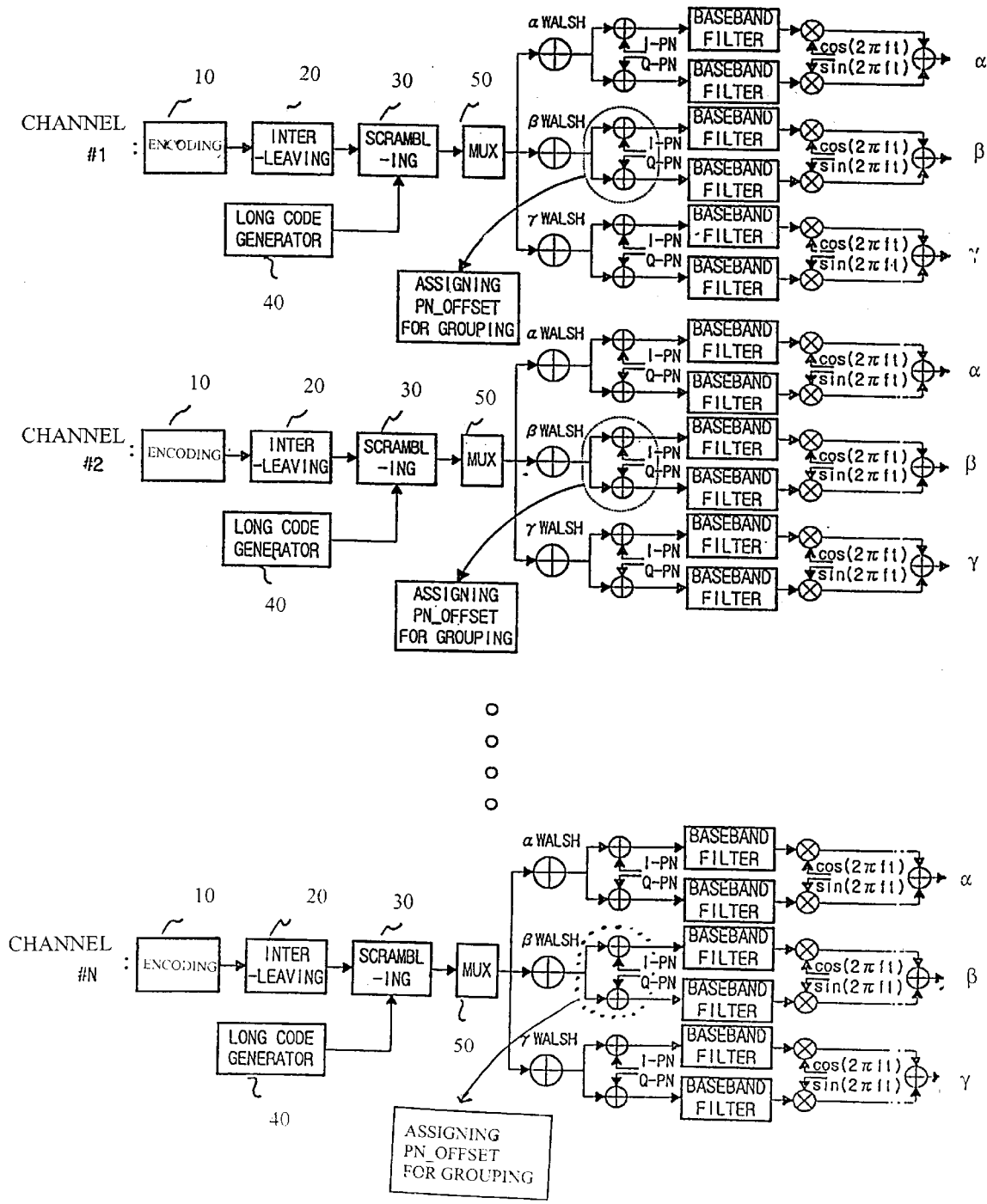
FIG. 2 is a block/flow diagram of the channel assigning path of a modulator chip in accordance with one aspect of the present invention.

Referring now to FIG. 2, a diagram illustrates the channel assigning path of the modulator chip according to the present invention. As illustrated, the modulated signals of each channel (i.e., Channel #1–#N) are transmitted through 3 paths α, β, and γ. Since each channel (shown in FIG. 2) has 3 paths, same traffic signals in each channel can be transmitted simultaneously through 3 paths. In each omni-cell, a channel is assigned through the first path a in each channel by using distinct PN offsets for each cell. In order to group a plurality of cells into an omni-cell configuration, pilot signals having a common PN offset are generated for each of the second paths in each channel of the cells being grouped (i.e., the common PN offset of each cell is transmitted through the corresponding second path). Accordingly, all the cells have a common PN offsets by simultaneously transmitting the common PN offset signals to be grouped to multiple channels through the unused channel paths (e.g., the second path β). Cell grouping is achieved by assigning the common PN offset to the desired cells.

Figure 3:
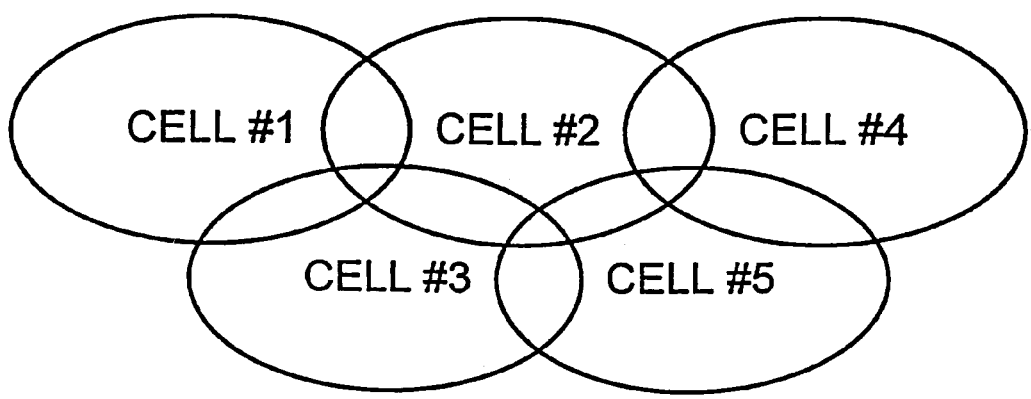
FIG. 3 is a diagram illustrating 5 overlapped cells.

Referring now to FIG. 3, a diagram illustrates a 5 omni-cell structure in which the cells overlap each other, i.e., cell #1, cell #2, cell #3, cell #4, and cell #5 each have overlapped regions between them. As explained above, each cell shown in FIG. 3 has 3 paths per channel and only the first path a is used among them under normal circumstances. A method for cell grouping omni-cells in accordance with the present invention will now be discussed with reference to FIG. 3 and the flow diagram of FIG. 4. Grouping of cells #1–#5, for example, is performed by selecting a common PN offset which is not similar to one of the distinct PN offsets used by cell #1, cell #2, cell #3, cell #4, or cell #5 (step 400). The pilot signals of the common PN offset are then assigned to an unused path (e.g., the second path β) of each cell being grouped (step 402).

Next, a determination is made as to whether the distinct PN offset of the first path and the common PN offset of the second path are transmitted from the same antenna (step 404). If the signals are generated from the same antenna (affirmative result in step 404), the terminal equipment recognizes the common PN offset pilot signals (step 406). In particular, the distinct PN offset transmitted through the first path (i.e., α) and the common PN offset transmitted through the second path (i.e., β) are separately received by the DU (digital unit) of the corresponding BTS, wherein they are combined in a transceiver, and then transmitted via an antenna (e.g., an omni directional antenna). After receiving the combined PN offset signals, the mobile station is tuned to the common PN offset.

A determination is then made as to whether the signal strength of the received common PN offset pilot signal exceeds a preselected threshold (step 408). If the signal strength exceeds the preselected threshold (affirmative result in step 408), the terminal equipment reports the strength to the corresponding BTS (step 410). Communication is then established with the corresponding BTS using the two paths (e.g., the first and second paths) (step 412).

Next, the signal strength of the distinct PN offset pilot signal of the first path is simultaneously lowered in the cells that are being grouped (step 414). A determination is then made as to whether the signal strength of the distinct PN offset pilot signal falls below a preselected threshold (step 416). When the signal strength falls below the preselected threshold (affirmative result in step 416), the terminal equipment informs the BTS of the weakened signal strength (step 418). The BTS then commands the terminal equipment to receive only the common PN offset signals, and the terminal equipments stops receiving the distinct PN offset (step 420). Particularly, in response to the BTS command signal, the terminal equipment stops transmitting and receiving the distinct PN offsets (in path 1), and begins transmitting and receiving with the common PN offset of the second path and consequently, each of the cells having the common PN offsets are grouped (step 422) in accordance with the above process.

Referring now to FIG. 5, a flow diagram illustrates a method for ungrouping omni-cells according to the present invention. Each of 5 cells (which have the common PN offsets) begin generating pilot signals having the original (i.e, distinct) PN offsets in the first path (step 500). A determination is then made as to whether the distinct PN offset pilot signal of the first path and the common PN offset pilot signal of the second path (which are combined) are emitted from the same antenna (step 502). If these signals are transmitted from the same antenna (affirmative result in step 502), the terminal equipment associated with each cell recognizes the distinct PN offset pilot signals (step 504). A determination is then made as to whether the signal strength of the distinct PN offset pilot signal of the first path exceeds a preselected threshold (step 506). If the signal strength exceeds the preselected threshold (affirmative result in step 506), the terminal equipment informs the corresponding BTS (step 508). The BTS then communicates with the user (i.e., transmits and receives signals) via path 1 and path 2 (step 510).

Next, the signal strength of the grouped common PN offset pilots of the second path are simultaneously lowered in the 5 cells (which are transmitting and receiving through paths 1 and 2) (step 512). A determination is then made as to whether the signal strength of the common PN offset signal falls below a preselected threshold (step 514). If the signal strength falls below the preselected threshold (affirmative result in step 514), the terminal equipment for each cell informs the corresponding BTS of weakened pilot signals (step 516). The BTS then commands the terminal to receive only the distinct PN offsets signals in the first paths, and the common PN offsets are not received (step 518). Particularly, the terminal equipment stops transmitting and receiving the grouped common PN offsets in the second path and transmits and receives with distinct PN offsets of the first path. Consequently, the 5 cells are ungrouped and begin processing their distinct PN offsets (step 520).

Applying the softer handoff procedure to the present invention, a plurality of cells having the same PN offsets are utilized as one cell. Consequently, the increased rate for handoff operations due to a fast moving terminal equipment is reduced. Accordingly, the signal traffic resulting from the handoff signals can be reduced, and the success rate of the call can increase during travel of the terminal equipment. In addition, space diversity effect can be obtained from the distributed antenna of the cell grouping and signal-to-noise is increased in reverse link since the distance between the same channel group in increased.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for grouping a plurality of cells in a cellular communication system, each of said cells including at least two channels each having a plurality of paths and each of said cells having a distinct PN (pseudorandom noise) offset pilot signal being assigned to a first path of said plurality of paths, said method comprising the steps of:

generating a common PN (pseudorandom noise) offset pilot signal at a second one of said paths of said channels in each of said plurality of cells, said common PN offset pilot signal not being utilized as said unique PN offset pilot signal at any of said plurality of cells;

determining if said common PN offset pilot signal and said distinct PN offset pilot signals are both emitted from an antenna;

recognizing, by a user terminal, a signal strength of said common PN offset pilot signal;

determining whether said signal strength of said common PN offset pilot signal exceeds a first preselected threshold if it is determined that said common and distinct PN offset signals are outputted from said antenna;

reporting said signal strength to a BTS (base station transceiver subsystem) if said signal strength exceeds said first preselected threshold;

establishing communication with users through said first and second paths;

weakening simultaneously said signal strength of distinct PN offset of said plurality of cells during said communication in said first and second paths;

reporting weakening of said distinct PN offset pilot signal to said BTS by said users of said plurality of cells;

commanding by said BTS to terminal equipment to receive only said common PN offset signals; and terminating, by said terminal, from transmitting and receiving said distinct PN offset signal, thereby grouping said plurality of cells having said common PN offset by transmitting and receiving only said PN offset.

2. A method for ungrouping a plurality of cells in a cellular communication system, each of said grouped cells including at least two channels each having a plurality of paths and each of said cells having a common PN (pseudorandom noise) offset pilot signal being assigned to one of said paths of said plurality of paths, said method comprising the steps of:

transmitting a plurality of distinct PN offset pilot signal at a first path in said channel for each of said grouped cells;

determining whether said distinct PN offset pilot signals and said common PN offset pilot signals of said grouped cells are outputted from the same antenna;

recognizing, by a user terminal, said distinct PN offset pilot signal after it is determined that said common and distinct PN offset signals are outputted from same antenna;

determining whether a signal strength of said distinct PN offset pilot signal exceeds a first preselected threshold;

reporting said signal strength of said distinct PN offset pilot signal to a BTS (base station transceiver subsystem) if said signal strength exceeds said first preselected threshold;

establishing communication with said user through path assigned to said common PN offset and said path assigned to said distinct PN offset of one channel;

simultaneously weakening said signal strength said common PN offset pilot signal of each of said grouped cells while communicating through said assigned paths;

determining whether the signal strength of said common PN offset pilot signal falls below a second preselected threshold;

reporting the signal strength of said common PN offset pilot signal to said BTS when said strength is determined to fall below said second preselected threshold;

commanding by said BTS to said user terminal equipment to receive only said distinct PN offset signals of said corresponding cells; and terminating, by said terminals, from transmitting and receiving said common PN offset, and ungrouping said grouped cells by transmitting and receiving only said corresponding distinct PN offset for each of said cells.

3. The method of claim 1, wherein said common and distinct PN offsets are transmitted simultaneously from one antenna.

* * * * *